United States Patent
Shamee

(10) Patent No.: US 11,664,894 B2
(45) Date of Patent: May 30, 2023

(54) PHOTONIC INTEGRATED CIRCUIT-BASED OPTICAL PHASED ARRAY COMMUNICATION SYSTEM

(71) Applicant: Raytheon Company, Waltham, MA (US)

(72) Inventor: Bishara Shamee, Playa Del Rey, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 17/643,114

(22) Filed: Dec. 7, 2021

(65) Prior Publication Data

US 2022/0224413 A1 Jul. 14, 2022

Related U.S. Application Data

(60) Provisional application No. 63/136,040, filed on Jan. 11, 2021.

(51) Int. Cl.
*H04B 10/114* (2013.01)
*H04B 10/40* (2013.01)

(52) U.S. Cl.
CPC ......... *H04B 10/1143* (2013.01); *H04B 10/40* (2013.01); *H04B 2210/006* (2013.01)

(58) Field of Classification Search
CPC ............... H04B 10/1143; H04B 10/40; H04B 2210/006
USPC ......................................................... 398/115
See application file for complete search history.

(56) References Cited

U.S. PATENT DOCUMENTS

| | | | |
|---|---|---|---|
| 10,020,882 B2 | 7/2018 | Uysal et al. | |
| 10,123,327 B2 | 11/2018 | Hu et al. | |
| 10,866,487 B1* | 12/2020 | Keller | G02F 1/365 |
| 11,183,757 B2* | 11/2021 | Puleri | H01Q 3/2676 |
| 2013/0177319 A1* | 7/2013 | Middleton | H01Q 3/2676 |
| | | | 398/115 |
| 2018/0026721 A1* | 1/2018 | Bock | H04B 10/64 |
| | | | 398/130 |

(Continued)

OTHER PUBLICATIONS

Essiambre et al., "Capacity Limits of Optical Fiber Networks," Journal of Lightwave Technology, vol. 28, No. 4, Feb. 2010, 40 pages.

(Continued)

*Primary Examiner* — Dalzid E Singh

(57) ABSTRACT

An apparatus includes an optical phased array having multiple array elements. Each array element includes an antenna element configured to transmit or receive an optical signal. Each array element also includes an electro-optic (EO) modulator associated with the antenna element, where the EO modulator is configured to modulate the optical signal transmitted or received by the antenna element. The antenna elements may be configured to transmit optical signals, the EO modulator of each array element may be configured to perform at least one of amplitude modulation and phase modulation, where at least one of the amplitude modulations and the phase modulation is based on encoded data. The antenna elements may be configured to receive optical signals, the EO modulator of each array element may be configured to perform at least one of phase modulation and amplitude modulation, and a decoder may be configured to recover data.

21 Claims, 5 Drawing Sheets

(56) References Cited

U.S. PATENT DOCUMENTS

| | | | |
|---|---|---|---|
| 2018/0039154 A1* | 2/2018 | Hashemi | G02F 1/2955 |
| 2018/0123699 A1* | 5/2018 | Fatemi | H04B 10/613 |
| 2019/0267708 A1* | 8/2019 | Tennant | H04B 10/505 |
| 2021/0006333 A1* | 1/2021 | Morton | H04B 10/25759 |

OTHER PUBLICATIONS

Stralka et al., "OFDM-based Wideband Phased Array Radar Architecture," IEEE Radar Conference—Proceedings, 2008, 6 pages.
Sousa et al., "Adaptive Beamforming Applied to OFDM Systems," MDPI Article, Sensors, 18(10), 2018, 15 pages.
Wikipedia, "Orthogonal frequency-division multiplexing," Dec. 2020, 26 pages.

* cited by examiner

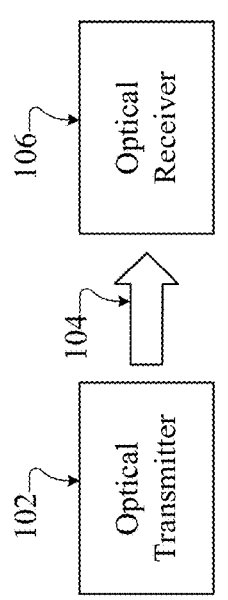
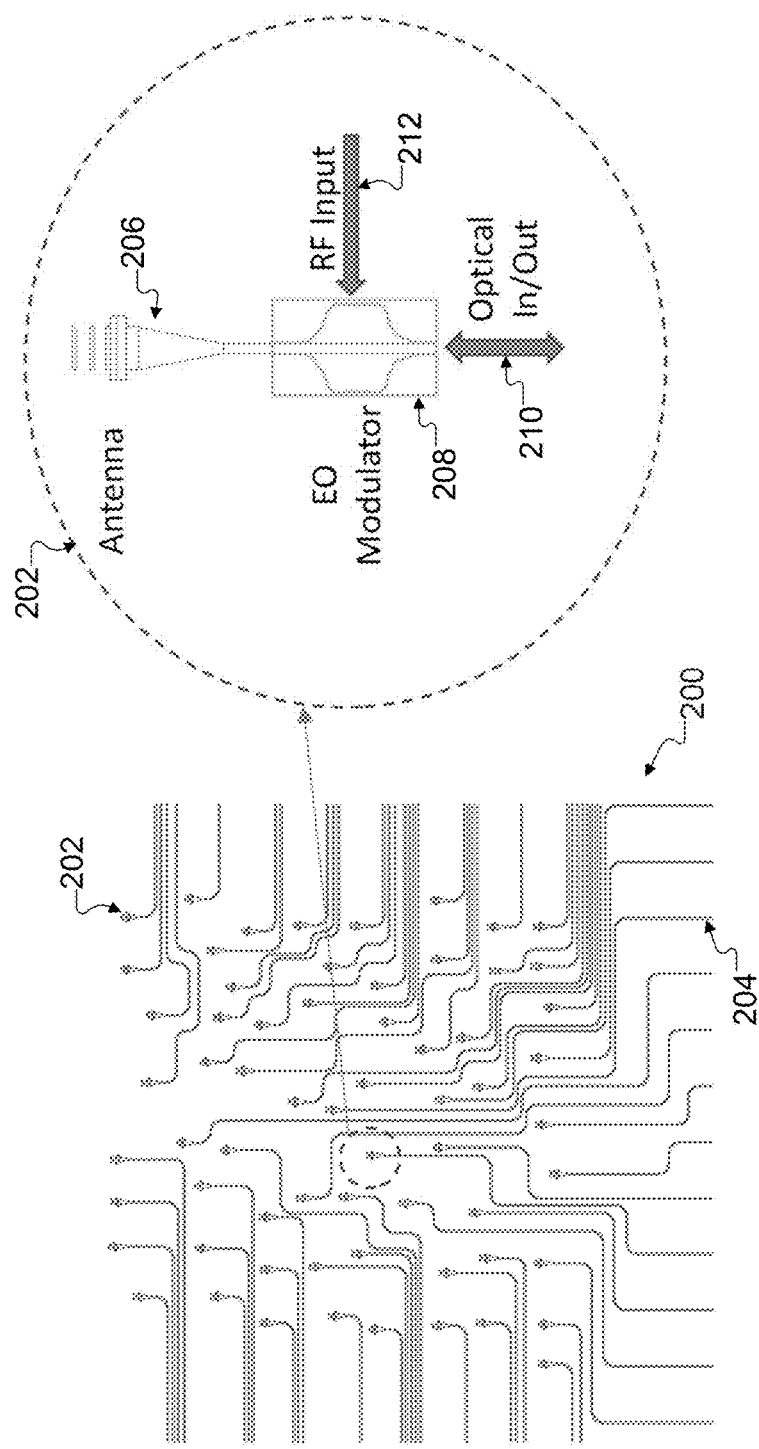
FIG. 1
FIG. 2

PHOTONIC INTEGRATED CIRCUIT-BASED OPTICAL PHASED ARRAY COMMUNICATION SYSTEM

CROSS-REFERENCE TO RELATED APPLICATION AND PRIORITY CLAIM

This application claims priority under 35 U.S.C. § 119(e) to U.S. Provisional Patent Application No. 63/136,040 filed on Jan. 11, 2021. This provisional patent application is hereby incorporated by reference in its entirety.

TECHNICAL FIELD

This disclosure relates generally to communication systems. More specifically, this disclosure relates to a photonic integrated circuit-based optical phased array communication system.

BACKGROUND

Transmitting optical phased arrays (OPAs) utilize array elements to form transmitted beams, where all array elements of an optical phased array typically receive the same input signal and adjust the phase of each tributary to perform beam shaping and/or beam pointing. Receiving optical phased arrays also utilize array elements to receive incoming beams. However, wider-bandwidth transmissions and receptions can impose tight linearity requirements on the array elements of an optical phased array since each array element has to accept the wider bandwidth. This can be problematic in many optical phased array designs.

SUMMARY

This disclosure relates to a photonic integrated circuit-based optical phased array communication system.

In a first embodiment, an apparatus includes an optical phased array having multiple array elements. Each array element of the optical phased array includes an antenna element configured to transmit or receive an optical signal. Each array element of the optical phased array also includes an electro-optic (EO) modulator associated with the antenna element, where the EO modulator is configured to modulate the optical signal transmitted or received by the antenna element.

In a second embodiment, a method includes engaging in optical communications using an optical phased array having multiple array elements. Each array element of the optical phased array includes an antenna element that transmits or receives an optical signal. Each array element of the optical phased array also includes an EO modulator associated with the antenna element, where the EO modulator modulates the optical signal transmitted or received by the antenna element.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 1 illustrates an example system supporting photonic integrated circuit-based optical phased array communication according to this disclosure;

FIG. 2 illustrates an example photonic integrated circuit-based optical phased array according to this disclosure;

DETAILED DESCRIPTION

FIGS. 1 through 6, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, transmitting optical phased arrays (OPAs) utilize array elements to form transmitted beams, where all array elements of an optical phased array typically receive the same input signal and adjust the phase of each tributary to perform beam shaping and/or beam pointing. Receiving optical phased arrays also utilize array elements to receive incoming beams. However, wider-bandwidth transmissions and receptions can impose tight linearity requirements on the array elements of an optical phased array since each array element has to accept the wider bandwidth. This can be problematic in many optical phased array designs.

Next-generation optical phased arrays are being fabricated on photonic integrated circuits (PICs). These optical phased arrays can be used in various systems, such as laser communication systems. This disclosure describes various signal encoding/decoding architectures that utilize the capabilities of photonic integrated circuits, such as multi-wavelength generation, phasing, and combining, to encode and decode optical signals used for communications or other purposes. Among other things, some embodiments of the architectures may utilize standard devices that can be fabricated in photonic integrated circuits using foundry process design kits (PDKs) to create the architectures, which can help to simplify fabrication and reduce costs of the architectures.

Figure 3:
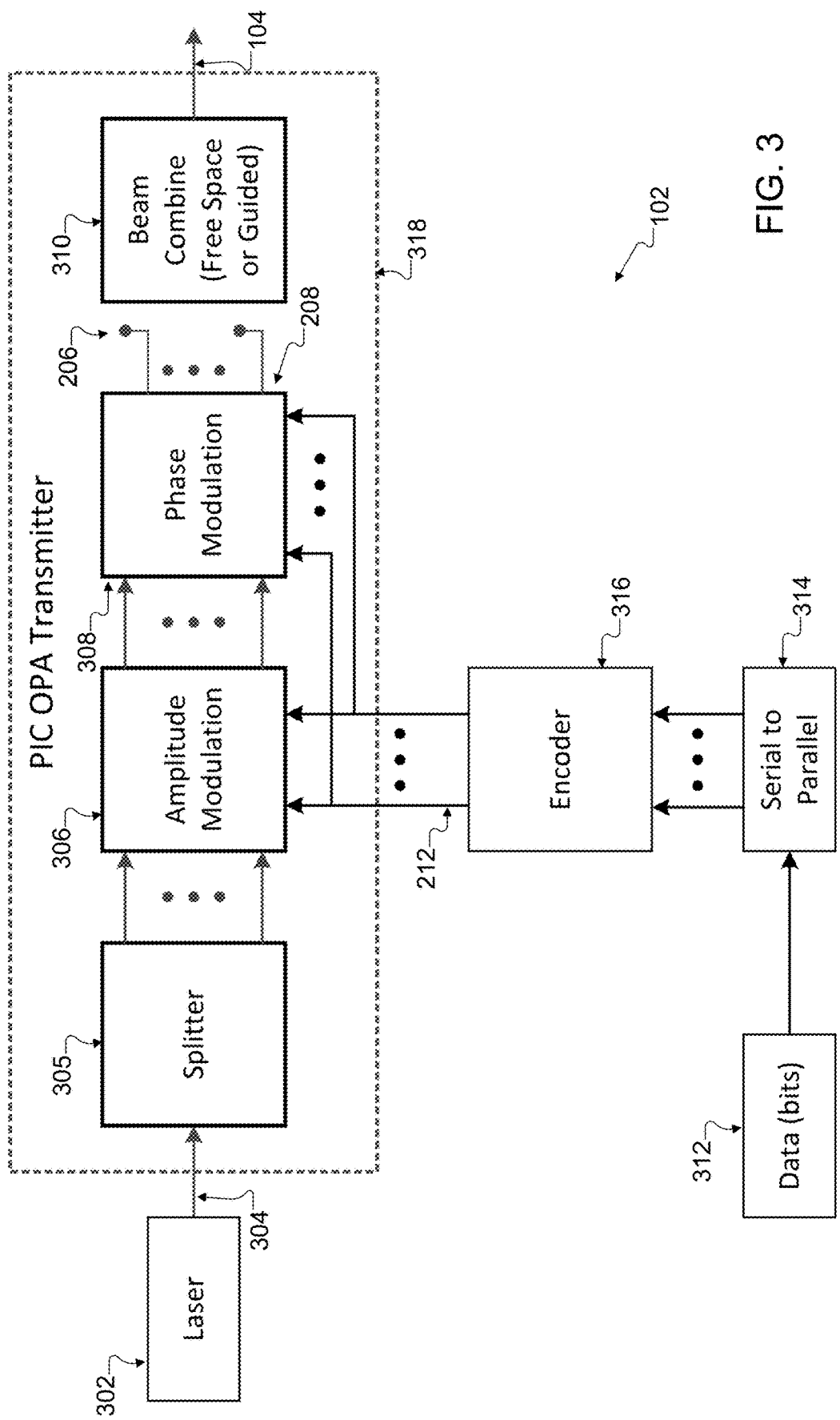
FIG. 3 illustrates an example optical transmitter supporting photonic integrated circuit-based optical phased array communication according to this disclosure.

FIG. 1 illustrates an example system 100 supporting photonic integrated circuit-based optical phased array communication according to this disclosure. As shown in FIG. 1, the system 100 includes an optical transmitter 102, which generally operates to produce optical signals 104 used for communication or other purposes. For example, the optical transmitter 102 may encode information onto the optical signals 104, such as by using suitable amplitude, phase, frequency, and/or other modulation(s) of light. Note that any suitable type of modulation scheme may be used here to encode information onto the optical signals 104. As described in more detail below, the optical transmitter 102 includes at least one PIC-based optical phased array, which is used to generate the optical signals 104. One example embodiment of a PIC-based optical phased array is shown in FIG. 2, which is described in more detail below. Also, one example embodiment of the optical transmitter 102 is shown in FIG. 3, which is described in more detail below.

Figure 4:
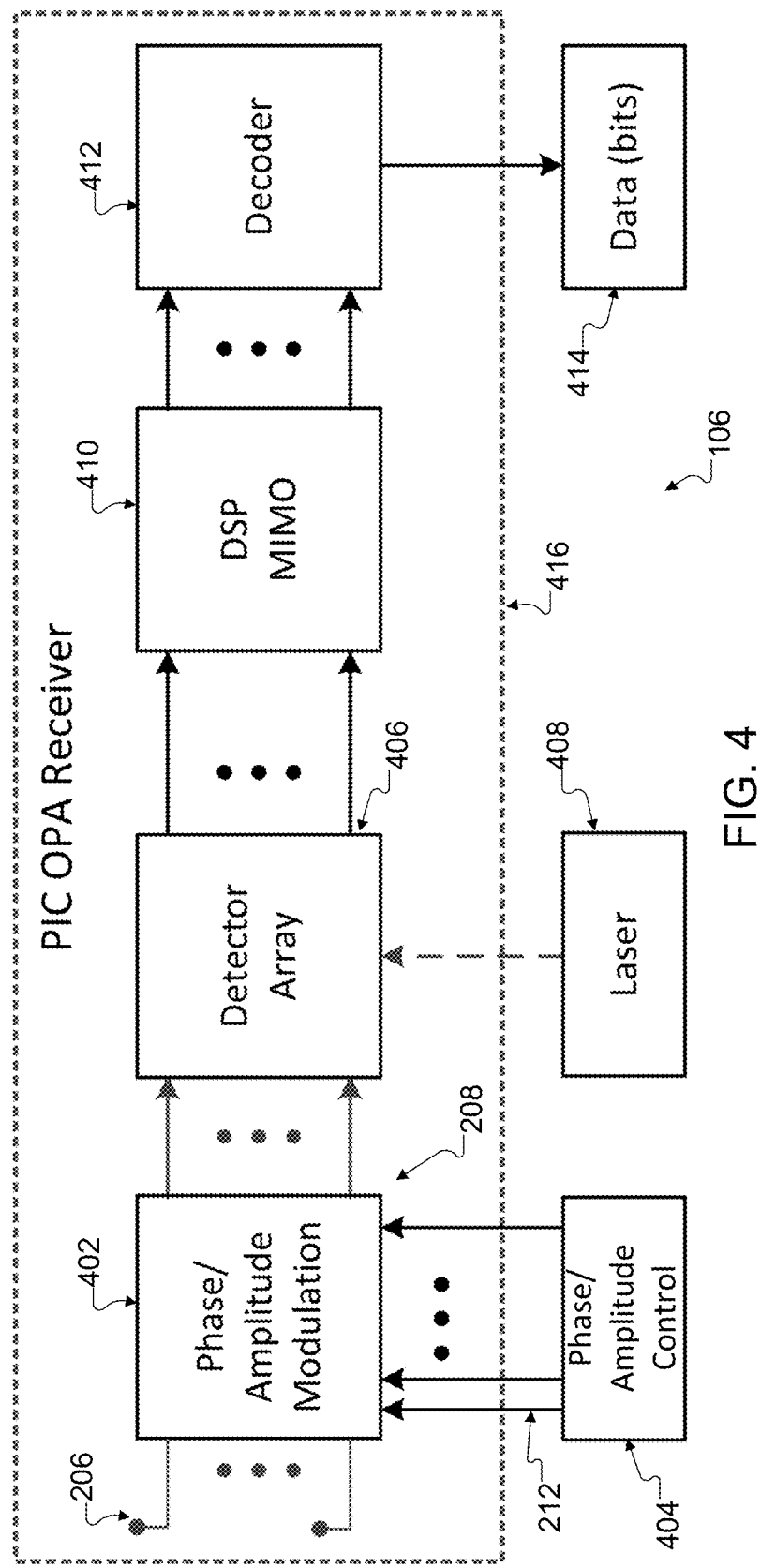
FIG. 4 illustrates an example optical receiver supporting photonic integrated circuit-based optical phased array communication according to this disclosure.

The optical signals 104 can be transmitted through free space or other transmission medium to an optical receiver 106, which processes the optical signals 104 in order to recover the information encoded onto the optical signals 104. For example, the optical receiver 106 can identify the amplitude, phase, frequency, and/or other modulation(s) of light in the optical signals 104 and use the identified modulation(s) to recover the information. Note that any suitable type of demodulation scheme may be used here to recover the information encoded onto the optical signals 104. As described in more detail below, the optical receiver 106 includes at least one PIC-based optical phased array, which is used to receive and process the optical signals 104. One example embodiment of the optical receiver 106 is shown in FIG. 4, which is described in more detail below.

Although FIG. 1 illustrates one example of a system 100 supporting photonic integrated circuit-based optical phased array communication, various changes may be made to FIG. 1. For example, the system 100 may include any number of optical transmitters 102 and optical receivers 106 communicating with one another via any number of optical signals 104. Also, the system 100 is shown in simplified form here and may include any number of additional components in any suitable configuration.

FIG. 2 illustrates an example photonic integrated circuit-based optical phased array 200 according to this disclosure. For ease of explanation, the PIC-based optical phased array 200 may be described as being used in the optical transmitter 102 and the optical receiver 106 of FIG. 1. However, the PIC-based optical phased array 200 may be used in any other suitable devices and in any other suitable systems.

As shown in FIG. 2, the PIC-based optical phased array 200 includes an array of individual array elements 202. Each array element 202 is configured to generate and transmit or receive and process one or more optical signals, such as one or more of the optical signals 104. In this example, the optical phased array 200 represents an 8×8 array of individual array elements 202, meaning there are eight rows of array elements 202 and each row includes eight array elements 202. However, other numbers of array elements 202 may be used here, and the optical phased array 200 may arrange the array elements 202 in any suitable one-dimensional or multi-dimensional arrangement.

Each array element 202 here is coupled to a signal pathway 204. The signal pathways 204 are configured to transport optical signals to or from the array elements 202. For example, in a transmitting optical phased array 200, the signal pathways 204 can provide optical signals from a laser or other optical source to the array elements 202 for transmission. In a receiving optical phased array 200, the signal pathways 204 can provide optical signals received by the array elements 202 to optical detectors or other components for processing. Each signal pathway 204 includes any suitable structure configured to transport optical signals, such as optical waveguides. Because of the design or appearance of the signal pathways 204, the signal pathways 204 are often referred to as representing or forming parts of "tributaries" in an optical phased array.

As shown in the enlarged portion of the optical phased array in FIG. 2, each array element 202 includes an antenna element 206 and an electro-optic (EO) modulator 208. Each antenna element 206 is configured to physically transmit or receive one or more optical signals to or from one or more external devices or systems. For example, each antenna element 206 may include a nanophotonic antenna or other antenna element that transmits or receives at least one optical signal, along with one or more lenses or other optical devices configured to focus or otherwise process the at least one optical signal. Depending on the implementation, the antenna element 206 may sometimes be referred to as an emitter in a transmitting array 200 or a receiver in a receiving array 200.

The EO modulator 208 is configured to modulate an optical signal 210 passing through the EO modulator 208 based on a radio frequency (RF) input signal 212. For example, in a transmitting array 200, each EO modulator 208 may be configured to receive an outgoing optical signal 210 and modulate the optical signal 210 based on the RF input signal 212 in order to produce an optical signal 104 for transmission. As described below, each EO modulator 208 in a transmitting array 200 may perform amplitude modulation, phase modulation, or other suitable modulation(s) to encode information onto the outgoing optical signal 210 and/or tune a lower-rate phase for beam pointing. In a receiving array 200, each EO modulator 208 may be configured to receive an incoming optical signal 104 and modulate the optical signal 104 based on the RF input signal 212 in order to produce an optical signal 210 for further processing. As described below, each EO modulator 208 in a receiving array 200 may perform phase modulation or other suitable modulation(s) to recover information encoded onto the incoming optical signal 104. Depending on the implementation, in some cases, the RF input signal 212 may represent an optical signal itself, although this need not be the case.

As can be seen in this example, each antenna element 206 may be associated with its own EO modulator 208. This allows for very precise modulation control to be applied to the signals in the various tributaries of the optical phased array 200. For example, in a transmitting array 200, the EO modulators 208 can be used to perform amplitude and phase modulation to support beam shaping and/or beam pointing operations. Beam shaping refers to the creation of an optical beam having a desired energy distribution in its cross-sectional shape, while beam pointing refers to the transmission of an optical beam in a desired direction. In a receiving array 200, the EO modulators 208 can be used to perform phase modulation to support reception of encoded signals.

Although FIG. 2 illustrates one example of a photonic integrated circuit-based optical phased array 200, various changes may be made to FIG. 2. For example, the optical phased array 200 may include any suitable number of array elements 202 in any suitable arrangement. Also, the optical phased array 200 may include any suitable signal pathways 204 leading to or from the array elements 202.

FIG. 3 illustrates an example optical transmitter 102 supporting photonic integrated circuit-based optical phased array communication according to this disclosure. For ease of explanation, the optical transmitter 102 may be described as being used in the system 100 of FIG. 1 and as including the PIC-based optical phased array 200 of FIG. 2. However, the optical transmitter 102 may be used in any other systems and may include any other suitable PIC-based optical phased array designed in accordance with this disclosure.

As shown in FIG. 3, the optical transmitter 102 includes at least one laser 302, which is configured to produce at least one optical beam 304. The laser 302 includes any suitable structure configured to generate at least one optical signal to be modulated and transmitted. Any suitable type of laser 302 may be used here, and the type of laser and the characteristics of the laser may vary based on the desired application.

For example, when used for data communications, the type or power of the laser 302 may depend on the distance over which the data will travel.

The optical beam 304 is subjected to modulation, which in this example occurs using amplitude modulation 306 and phase modulation 308 to respectively modify the amplitude and phase of different portions of the optical beam 304. Note that the amplitude modulation 306 and phase modulation 308 may be performed by the EO modulators 208 of the optical phased array 200. The optical beam 304 here can be split into multiple optical signals (such as optical signals 210) using a beam splitter 305, which allows different optical signals to be amplitude- and phase-modulated in different ways to support desired beam shaping, beam pointing, or other operations. The amplitude modulation 306 and the phase modulation 308 can be performed here in any suitable manner. The modulated optical signals are provided to the antenna elements 206 for transmission. In this example, a beam combiner 310 may be used to combine the modulated optical signals from the antenna elements 206 into a combined optical signal 104, which can be transmitted through free space or some other transmission medium (such as an optical fiber, another waveguide, or other guided medium) to an optical receiver 106. The beam combiner 310 may support any suitable near field-to-far field mapping or other beam combination approach.

In this example, incoming data 312 to be transmitted (such as in the form of a bit stream) is provided to a serial-to-parallel converter 314, which converts the incoming data 312 from serial to parallel format. The parallel data is provided to an encoder 316, which partitions the parallel data into multiple data streams and encodes the data streams for use in the amplitude and phase modulations. For example, the encoder 316 may encode the data streams in order to generate the RF input signals 212, which can be provided to the EO modulators 208 for use in controlling the modulations 306 and 308. Each data steam here can be associated with one array element 202 or a group of array elements 202 of the PIC-based optical phased array 200.

The encoder 316 may support any suitable encoding technique in order to support any desired optical modulation scheme here. In some embodiments, for example, the encoder 316 may perform an Inverse Fast Fourier Transform (IFFT) in order to generate Orthogonal Frequency Division Multiplexing (OFDM) waveforms or otherwise generate waveforms using an orthogonal multiplexing technique, and the waveforms may be used with the amplitude modulation 306 and phase modulation 308 (such as when the phase modulation 308 is implemented as a ring resonator). Another encoding scheme that may be used by the encoder 316 is traditional Quadrature Amplitude Modulation (QAM). Still another encoding scheme that may be used by the encoder 316 is a ring constellation, where bits are grouped into symbols and each symbol of the constellation represents a specific phase and amplitude to be modulated by a phased array element or group of elements. The encoder 316 represents any suitable structure configured to encode information.

Note that in FIG. 3, a dashed box 318 indicates that various components of the optical transmitter 102 may be implemented on a single chip. This may facilitate simpler fabrication, installation, and use of the optical transmitter 102. However, this particular implementation is not required, and other implementations of the optical transmitter 102 may be used. For example, additional components of the optical transmitter 102 may be formed on the same chip, or the modulations and beam combining may not be provided on the same chip.

Although FIG. 3 illustrates one example of an optical transmitter 102 supporting photonic integrated circuit-based optical phased array communication, various changes may be made to FIG. 3. For example, various components shown in FIG. 3 may be combined, further subdivided, replicated, omitted, or rearranged and additional components may be added according to particular needs.

FIG. 4 illustrates an example optical receiver 106 supporting photonic integrated circuit-based optical phased array communication according to this disclosure. For ease of explanation, the optical receiver 106 may be described as being used in the system 100 of FIG. 1 and as including the PIC-based optical phased array 200 of FIG. 2. However, the optical receiver 106 may be used in any other systems and may include any other suitable PIC-based optical phased arrays designed in accordance with this disclosure.

As shown in FIG. 4, the optical receiver 106 receives optical signals as captured by the antenna elements 206 of the optical phased array, and modulation or phase and amplitude modifications 402 are applied to the received optical signals. Note that the modulation or phase and amplitude modifications 402 may be performed by the EO modulators 208 of the optical phased array 200. The modulation or phase and amplitude modifications 402 for each antenna element 206 here can be adjusted individually under the control of a control unit 404, which can generate the RF signals 212 used to control the modulation or phase and amplitude modifications 402. For instance, the control unit 404 can control the modulation or phase and amplitude modifications 402 to apply phase control to the incoming wavefront of the received optical signals 104 in order to decompose the wavefront. The modulation or phase and amplitude modifications 402 can be performed here in any suitable manner, such as with a ring resonator. The control unit 404 includes any suitable structure configured to provide phase and/or amplitude control for incoming optical signals.

The modulated optical signals are provided to a detector array 406, which converts the optical signals into corresponding electrical signals. The detector array 406 includes any suitable structure configured to convert optical signals into electrical signals, such as photodiodes or other photodetectors. Note that the number and arrangement of the detectors in the detector array 406 can vary as needed or desired. In some cases, laser input from a laser 408 may be combined with the modulated optical signals prior to detection, which can be done to support coherent detection in the optical receiver 106. The laser 408 includes any suitable structure configured to generate laser energy for coherent detection, and any suitable type of laser 408 may be used here. In other cases, such as those supporting direct detection, the laser 408 may be omitted.

The modulated optical signals are individually detected and processed by providing the electrical signals to a digital signal processor (DSP) 410, which processes the electrical signals using Multiple Input Multiple Output (MIMO) processing or other suitable diagonalization or other signal processing technique(s). This helps to separate the individual data streams contained in the incoming optical signals 104. The results of the processing are provided to a decoder 412, which decodes the processing results in order to recover data 414 (such as a bit stream) consistent with the transmitter's modulation format. For example, the decoder 412 can decode the modulation format supported by the encoder 316.

Ideally, the recovered data 414 matches the original data 312, although some error correction or other processing may be performed here to correct transmission errors.

Note that in FIG. 4, a dashed box 416 again indicates that various components of the optical receiver 106 may be implemented on a single chip. This may facilitate simpler fabrication, installation, and use of the optical receiver 106. However, this particular implementation is not required, and other implementations of the optical receiver 106 may be used. For example, additional components of the optical receiver 106 may be formed on the same chip, or the modulation, detection, signal processing, and decoding may not be provided on the same chip.

Although FIG. 4 illustrates one example of an optical receiver 106 supporting photonic integrated circuit-based optical phased array communication, various changes may be made to FIG. 4. For example, various components shown in FIG. 4 may be combined, further subdivided, replicated, omitted, or rearranged and additional components may be added according to particular needs.

Figure 5:
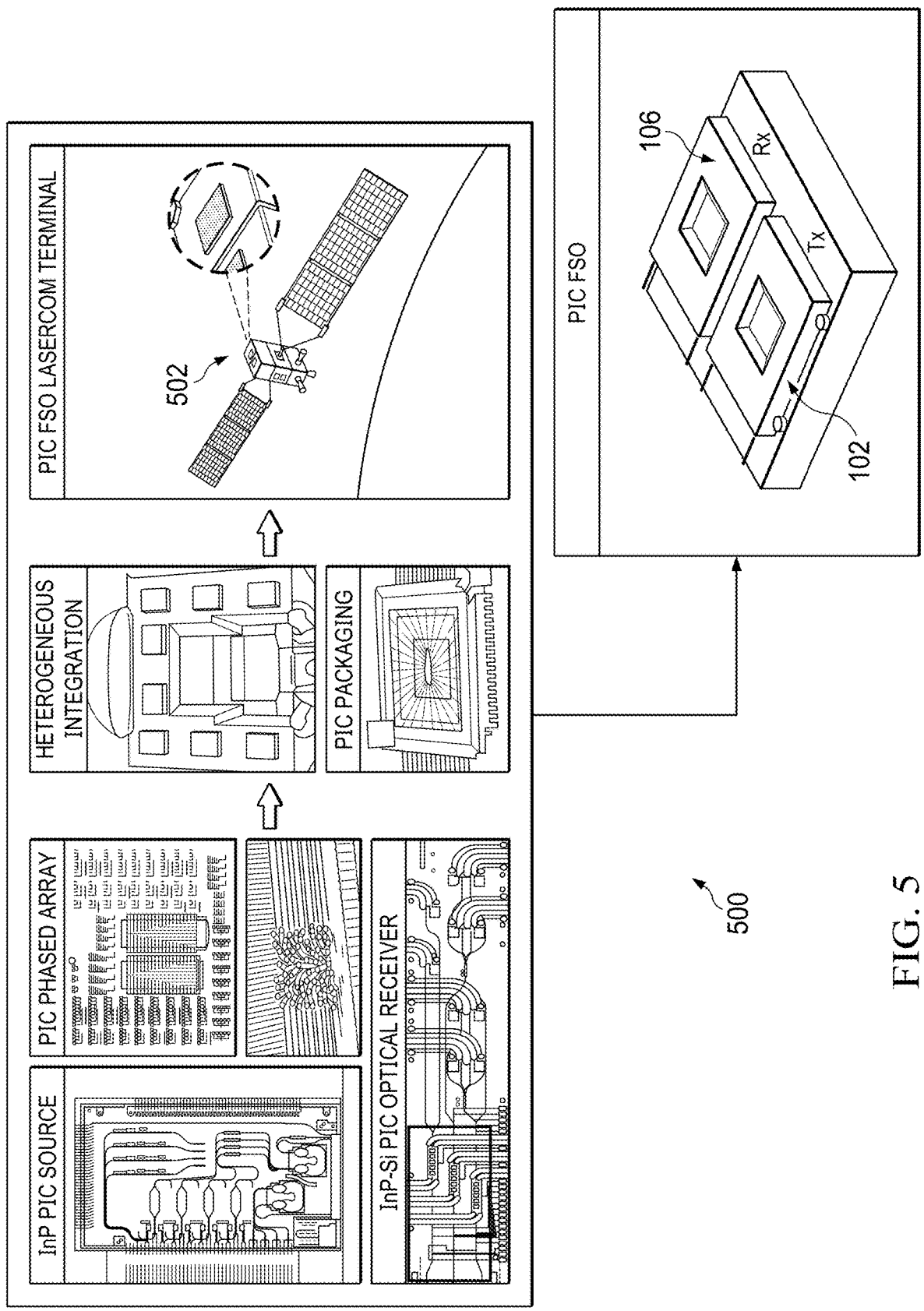
FIG. 5 illustrates an example application supporting photonic integrated circuit-based optical phased array communication according to this disclosure.

Note that these types of optical transmitter and receiver architectures may find use in a number of applications. For instance, FIG. 5 illustrates an example application 500 supporting photonic integrated circuit-based optical phased array communication according to this disclosure. This particular application 500 involves using the optical transmitter and receiver architectures to support laser-based satellite communications. As shown in FIG. 5, PIC-based optical phased arrays may be fabricated using indium phosphide (InP) or other suitable materials. The PIC-based optical phased arrays can be integrated into silicon-based or other optical transmitters and receivers, which supports heterogenous integration of the PIC-based optical phased arrays. The optical transmitter and receiver may be packaged side-by-side and used in a satellite 502 or other larger system.

Although FIG. 5 illustrates one example of an application 500 supporting photonic integrated circuit-based optical phased array communication, various changes may be made to FIG. 5. For example, the transmit and receive architectures may be used (together or separately) in any other suitable applications. Also, the PIC-based optical phased arrays and the transmit and receive architectures may be fabricated from any suitable materials, integrated in any suitable manner, and packaged in any suitable manner.

Figure 6:
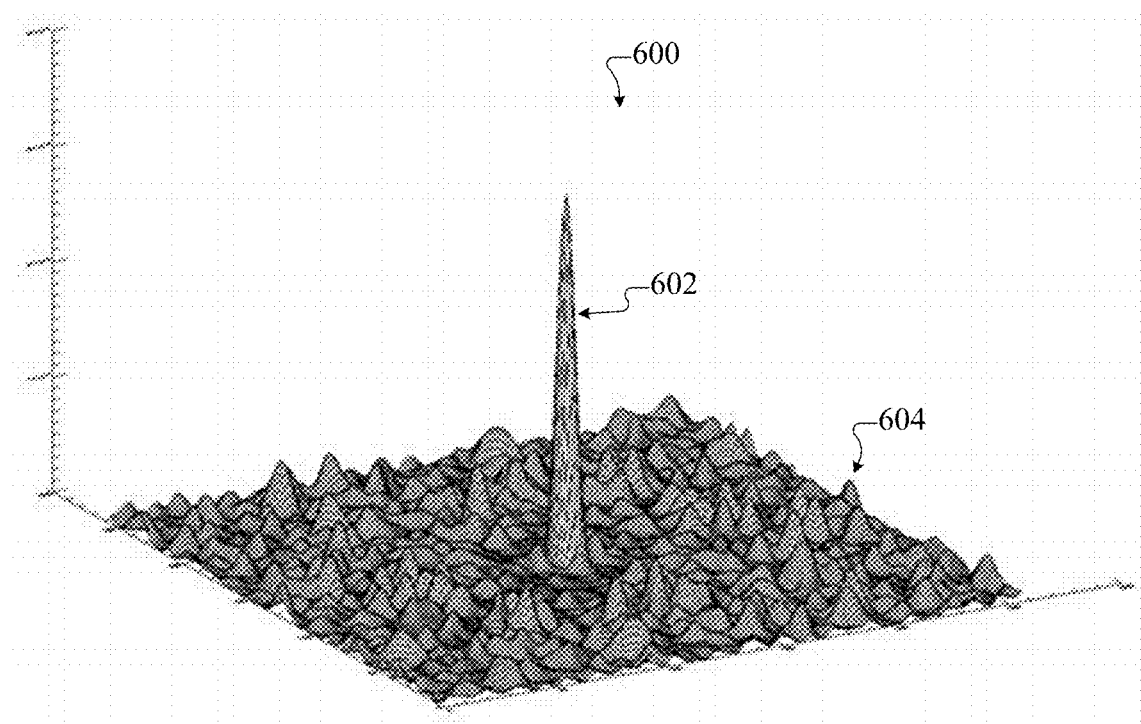
FIG. 6 illustrates an example beam shaping performed using a photonic integrated circuit-based optical phased array according to this disclosure.

Also note that these types of optical transmitter and receiver architectures may be used to transmit or receive any desired optical beams having any suitable beam forms. For example, FIG. 6 illustrates an example beam shaping performed using a photonic integrated circuit-based optical phased array according to this disclosure. As shown in FIG. 6, a beam pattern 600 can be created by suitable modulation of the elements in a photonic integrated circuit-based optical phased array, such as the optical phased array 200. Here, the beam pattern 600 is plotted as transmit intensity along the vertical axis and (x, y) locations of array elements 202 in the optical phased array 200 along the other two axes. As can be seen here, one portion 602 of the beam pattern 600 is most intense and far exceeds other intensities 604 of the beam pattern 600. This type of beam pattern 600 may be used to direct an optical beam towards a target (such as another node) to support communication of information. This particular beam pattern 600 is achievable by modulating suitable array elements' phases for both beam shaping and information transfer.

Although FIG. 6 illustrates one example of beam shaping performed using a photonic integrated circuit-based optical phased array, various changes may be made to FIG. 6. For example, any other suitable waveform may be generated using a photonic integrated circuit-based optical phased array. The example shown in FIG. 6 is merely an example of any specific type of beam pattern that may be used here.

The following describes example embodiments of this disclosure that implement or relate to a photonic integrated circuit-based optical phased array communication system. However, other embodiments may be used in accordance with the teachings of this disclosure.

In a first embodiment, an apparatus includes an optical phased array having multiple array elements. Each array element of the optical phased array includes an antenna element configured to transmit or receive an optical signal. Each array element of the optical phased array also includes an EO modulator associated with the antenna element, where the EO modulator is configured to modulate the optical signal transmitted or received by the antenna element.

In a second embodiment, a method includes engaging in optical communications using an optical phased array having multiple array elements. Each array element of the optical phased array includes an antenna element that transmits or receives an optical signal. Each array element of the optical phased array also includes an EO modulator associated with the antenna element, where the EO modulator modulates the optical signal transmitted or received by the antenna element.

Any single one or any suitable combination of the following features may be used with the first or second embodiment. The antenna elements may be configured to transmit optical signals, the EO modulator of each array element may be configured to perform at least one of amplitude modulation and phase modulation, and an encoder may be configured to encode data (where at least one of the amplitude modulation and the phase modulation in the array elements based on the encoded data). A laser may be configured to generate an optical beam, and the EO modulators of the array elements may be configured to modulate different portions of the optical beam or the optical beam. A beam combiner may be configured to combine the optical signals from the antenna elements into a combined optical signal for transmission. A serial-to-parallel converter may be configured to convert the data from a serial format to a parallel format and to provide the data in the parallel format to the encoder, and parallel data streams generated by the serial-to-parallel converter may be associated with different array elements or different groups of array elements. The encoder may be configured to perform encoding using an orthogonal multiplexing technique. The antenna elements may be configured to receive optical signals, the EO modulator of each array element may be configured to perform at least one of phase modifications and amplitude modifications, and a decoder may be configured to recover data encoded on the received optical signals. A detector array may be configured to convert the modified optical signals into electrical signals. A laser may be configured to generate laser input that is combined with the modified optical signals prior to detection by the detector array. A processor may be configured to process the electrical signals in order to process individual ones of the modified optical signals and to output results to the decoder. The optical phased array may form part of an optical transmitter, a second optical phased array may form part of an optical receiver, and the optical transmitter and the optical receiver may be packaged side-by-side.

It may be advantageous to set forth definitions of certain words and phrases used throughout this patent document.

The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   an optical phased array comprising multiple array elements, wherein each array element of the optical phased array comprises:
      an antenna element configured to transmit an optical signal; and
      an electro-optic (EO) modulator associated with the antenna element, the EO modulator configured to modulate the optical signal transmitted by the antenna element, the EO modulator configured to perform at least one of amplitude modulation and phase modulation; and
   an encoder configured to encode data, at least one of the amplitude modulation and the phase modulation in the array elements based on the encoded data.

2. The apparatus of claim 1, further comprising:
   a laser configured to generate an optical beam;
   wherein the EO modulators of the array elements are configured to modulate different portions of the optical beam or the optical beam.

3. The apparatus of claim 1, further comprising:
   a beam combiner configured to combine the optical signals from the antenna elements into a combined optical signal for transmission.

4. The apparatus of claim 1, further comprising:
   a serial-to-parallel converter configured to convert the data from a serial format to a parallel format and to provide the data in the parallel format to the encoder, wherein parallel data streams generated by the serial-to-parallel converter are associated with different array elements or different groups of array elements.

5. The apparatus of claim 1, wherein the encoder is configured to perform encoding using an orthogonal multiplexing technique.

6. The apparatus of claim 1, wherein:
   the optical phased array forms part of an optical transmitter;
   a second optical phased array forms part of an optical receiver; and
   the optical transmitter and the optical receiver are positioned side-by-side.

7. An apparatus comprising:
   an optical phased array comprising multiple array elements, wherein each array element of the optical phased array comprises:
      an antenna element configured to receive an optical signal; and
      an electro-optic (EO) modulator associated with the antenna element, the EO modulator configured to modulate the optical signal received by the antenna element, the EO modulator configured to perform at least one of phase modifications and amplitude modifications; and
   a decoder configured to recover data encoded on the received optical signals.

8. The apparatus of claim 7, wherein:
   the antenna elements are further configured to transmit optical signals; and
   the apparatus further comprises an encoder configured to encode data, at least one of the amplitude modifications and the phase modifications in the array elements based on the encoded data.

9. The apparatus of claim 7, further comprising:
   a detector array configured to convert the modulated optical signals into electrical signals.

10. The apparatus of claim 9, further comprising:
    a laser configured to generate laser input that is combined with the modulated optical signals prior to detection by the detector array.

11. The apparatus of claim 9, further comprising:
    a processor configured to process the electrical signals in order to process individual ones of the modulated optical signals and to output results to the decoder.

12. An apparatus comprising:
    an optical phased array comprising multiple array elements, wherein each array element of the optical phased array comprises:
       an antenna element configured to transmit or receive an optical signal; and
       an electro-optic (EO) modulator associated with the antenna element, the EO modulator configured to modulate the optical signal transmitted or received by the antenna element;
    wherein:
       the optical phased array forms part of an optical transmitter;
       a second optical phased array forms part of an optical receiver; and
       the optical transmitter and the optical receiver are packaged side-by-side.

13. A method comprising:
engaging in optical communications using an optical phased array comprising multiple array elements, wherein each array element of the optical phased array comprises:
an antenna element that transmits an optical signal; and
an electro-optic (EO) modulator associated with the antenna element, the EO modulator modulating the optical signal transmitted by the antenna element, the EO modulator performing at least one of amplitude modulation and phase modulation; and
encoding data using an encoder, at least one of the amplitude modulation and the phase modulation in the array elements based on the encoded data.

14. The method of claim 13, further comprising:
generating an optical beam using a laser;
wherein the EO modulators of the array elements modulate different portions of the optical beam or the optical beam.

15. The method of claim 13, further comprising:
combining the optical signals from the antenna elements into a combined optical signal for transmission using a beam combiner.

16. The method of claim 13, further comprising:
converting the data from a serial format to a parallel format using a serial-to-parallel converter; and
providing the data in the parallel format to the encoder such that parallel data streams generated by the serial-to-parallel converter are associated with different array elements or different groups of array elements.

17. The method of claim 13, wherein:
the antenna elements also receive optical signals;
the EO modulators perform at least one of phase modifications and amplitude modifications to generate modified optical signals; and
the method further comprises recovering data encoded on the received optical signals using a decoder.

18. The method of claim 17, further comprising:
converting the modified optical signals into electrical signals using a detector array.

19. The method of claim 18, further comprising:
generating laser input that is combined with the modified optical signals prior to detection by the detector array.

20. The method of claim 18, further comprising:
processing the electrical signals in order to process individual ones of the modified optical signals and outputting results to the decoder.

21. The method of claim 13, wherein:
the optical phased array forms part of an optical transmitter;
a second optical phased array forms part of an optical receiver; and
the optical transmitter and the optical receiver are positioned side-by-side.

* * * * *